(12) United States Patent
Bacquet et al.

(10) Patent No.: US 10,354,776 B2
(45) Date of Patent: *Jul. 16, 2019

(54) SELF HEALING MATERIALS AND CABLES

(71) Applicant: NEXANS, Paris (FR)

(72) Inventors: Gérard Marcel Bacquet, Houilles (FR); Seong-Jin Kim, Chungcheongbuk-do (KR); Dae-Up Ahn, Chungcheongbuk-do (KR); Kwon-Soon Kim, Chungcheongbuk-do (KR); Ji-Hyun Bae, Chungcheongbuk-do (KR); Young-Gu Kim, Chungcheongbuk-do (KR); Jun-Bae Jeon, Chungcheongbuk-do (KR); Mi-Geon Baek, Jeollabuk-do (KR)

(73) Assignee: NEXANS, Courbevoie (FR)

( * ) Notice: Subject to any disclaimer, the term of this patent is extended or adjusted under 35 U.S.C. 154(b) by 80 days.

This patent is subject to a terminal disclaimer.

(21) Appl. No.: 15/306,377

(22) PCT Filed: Apr. 10, 2015

(86) PCT No.: PCT/EP2015/057896
§ 371 (c)(1),
(2) Date: Oct. 24, 2016

(87) PCT Pub. No.: WO2015/162022
PCT Pub. Date: Oct. 29, 2015

(65) Prior Publication Data
US 2017/0047143 A1    Feb. 16, 2017

(30) Foreign Application Priority Data

Apr. 24, 2014   (KR) .................. 10-2014-0049616
Apr. 24, 2014   (KR) .................. 10-2014-0049622

(Continued)

(51) Int. Cl.
*C08K 3/34* (2006.01)
*H01B 3/44* (2006.01)
(Continued)

(52) U.S. Cl.
CPC ........... *H01B 3/441* (2013.01); *B29C 73/163* (2013.01); *B29C 73/22* (2013.01); *C08K 3/346* (2013.01);
(Continued)

(58) Field of Classification Search
CPC .......... C08L 91/00; C08L 23/16; C08L 90/00; C08L 31/04; C08L 51/06; C08L 51/003;
(Continued)

(56) References Cited

U.S. PATENT DOCUMENTS 3,956,420 A * 5/1976 Kato .................... C08K 5/3417
174/110 PM
4,200,561 A * 4/1980 Chang .................... A61K 8/042
260/DIG. 47

(Continued)

FOREIGN PATENT DOCUMENTS

CN   101404191   *   4/2009
CN   103724748   *   4/2014
(Continued)

OTHER PUBLICATIONS

Search Report dated Aug. 17, 2015.

*Primary Examiner* — Camie S Thompson
(74) *Attorney, Agent, or Firm* — Sofer & Haroun, LLP

(57) ABSTRACT

The present invention concerns a cable comprising an elongated conducting element and a self-healing material surrounding said elongated conducting element, characterized in that the self-healing material is a cross-linked material obtained from a polymeric composition comprising: A. a polymer matrix comprising at least one olefin polymer with (Continued)

hydrophilic moiety, and B. at least one amphiphilic compound, as self-healing additive.

23 Claims, 1 Drawing Sheet

(30) Foreign Application Priority Data

| | | | |
|---|---|---|---|
| May 5, 2014 | (EP) | ................................... | 14305661 |
| Oct. 15, 2014 | (EP) | ................................... | 14189034 |
| Nov. 24, 2014 | (EP) | ................................... | 14194575 |

(51) Int. Cl.

| | |
|---|---|
| H01B 7/18 | (2006.01) |
| H01B 13/06 | (2006.01) |
| C08K 9/04 | (2006.01) |
| H01B 7/295 | (2006.01) |
| H02G 1/16 | (2006.01) |
| B29C 73/16 | (2006.01) |
| B29C 73/22 | (2006.01) |
| C08L 23/16 | (2006.01) |
| C08K 5/098 | (2006.01) |
| C08K 5/14 | (2006.01) |
| C08L 91/00 | (2006.01) |

(52) U.S. Cl.
CPC ............... *C08K 5/098* (2013.01); *C08K 5/14* (2013.01); *C08K 9/04* (2013.01); *C08L 23/16* (2013.01); *C08L 91/00* (2013.01); *H01B 3/448* (2013.01); *H01B 7/1895* (2013.01); *H01B 7/295* (2013.01); *H01B 13/06* (2013.01); *H02G 1/16* (2013.01)

(58) Field of Classification Search
CPC ........ C08L 75/08; C08L 75/04; B29C 73/163; B29C 73/22; H01B 13/06; H01B 3/441; H01B 3/448; H01B 7/295; H01B 3/308; H01B 3/302; H01B 7/1895; H02G 1/16; C08K 5/14; C08K 3/22; C08K 5/0016; C08K 5/0025; C08K 2003/2224; C08K 2003/2227; C08K 2201/014
USPC ....................................... 428/292.1; 523/173
See application file for complete search history.

(56) References Cited

U.S. PATENT DOCUMENTS

| | | | | |
|---|---|---|---|---|
| 4,871,787 | A | * | 10/1989 | Yamamoto ............... C08K 3/22 523/122 |
| 5,902,591 | A | * | 5/1999 | Herstein ................. A61K 8/26 424/401 |
| 2003/0144401 | A1 | | 7/2003 | Ajbani et al. |
| 2003/0188879 | A1 | | 10/2003 | Easter |
| 2004/0072930 | A1 | * | 4/2004 | Lee .......................... C08K 3/22 524/101 |
| 2009/0258977 | A1 | | 4/2009 | Smetana |
| 2013/0008576 | A1 | | 1/2013 | Smetana |
| 2013/0338258 | A1 | | 12/2013 | Kim et al. |
| 2017/0190862 | A1 | * | 7/2017 | Ahn ......................... C08J 9/103 |

FOREIGN PATENT DOCUMENTS

| | | |
|---|---|---|
| EP | 0114724 | 8/1984 |
| WO | 2014000820 | 1/2014 |

* cited by examiner

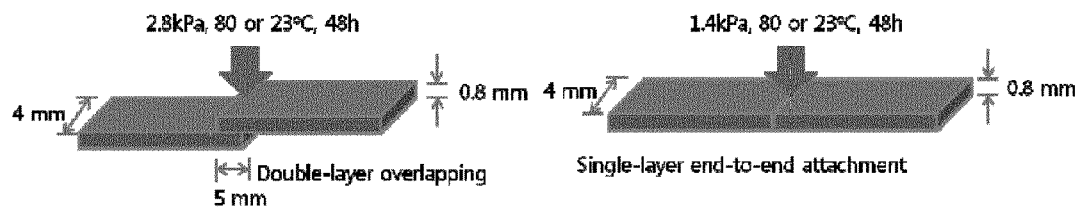
FIG.1a  FIG.1b
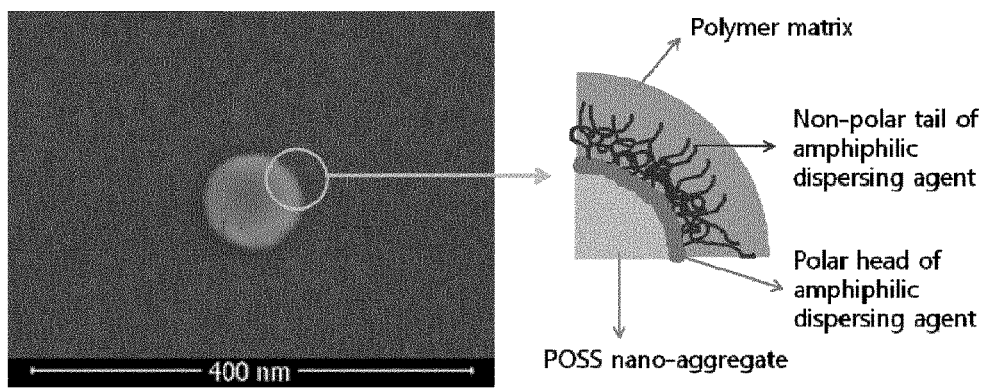
FIG.2

SELF HEALING MATERIALS AND CABLES

RELATED APPLICATIONS:

This application is a National Phase Application of PCT/EP2015/057896 filed on Apr. 10, 2015, which in turn claims the benefit of: Korean Patent Application No. 10-2014-0049616, filed on Apr. 24, 2014; Korean Patent Application No. 10-2014-0049622, filed on Apr. 24, 2014; European Patent Application No. 14 305 661.2, filed on May 5, 2014; European Patent Application No. 14 189 034.3, filed on Oct. 15, 2014; and European Patent Application No. 14 194 575.8, filed on Nov. 24, 2014, the entirety of which are incorporated by reference.

BACKGROUND:

Field of the Invention:

The present invention relates to a polymeric composition to obtain a self-healing cross-linked material, a self-healing cable comprising a self-healing cross-linked material, and to a process of manufacturing said cable.

More particularly, the self-healing cross-linked material is used in electric and/or optical cable(s) as a material surrounding one or several elongated conductors, said conductor(s) being insulated or not.

Description of Related Art

Cables may be subjected to damage during or after installation, so that cables with a polymeric layer repairing itself after mechanical damage significantly have an improved safety, lifetime, energy efficiency and environmental impact.

In this respect, the document FR-2 932 605 describes a self-healing electrically conductive cable comprising a conductive element surrounded by an insulating layer. The insulating layer incorporates micro-elements containing a polymerizable compound able to polymerize once the micro-element is damaged. Said micro-elements are distributed uniformly in bulk in the insulating layer in the form of long fibers aligned in the longitudinal direction of the cable, short fibers and microspheres.

OBJECTS AND SUMMARY

However, there is a growing need to develop new self-healing cable, especially with improved mechanical properties, and easy to manufacture.

The present invention seeks to provide a new self-healing cable having improved mechanical properties, such as elongation at break, while being easy to process and to manufacture.

To this end, an object of the present invention is a cable comprising an elongated conducting element and a self-healing material surrounding said elongated conducting element, characterized in that the self-healing material is a cross-linked material obtained from a polymeric composition comprising:

A. a polymer matrix comprising at least one olefin polymer with hydrophilic moiety, and B. at least one amphiphilic compound, as self-healing additive.

The present invention advantageously provides a self-healing material for cable, and more particularly an olefinic cross-linked material, preserving the cross-linked network and the mechanical properties of the material even if the cable is subjected to damage during or after installation. Hence, the cable of the invention significantly has an improved safety, lifetime, energy efficiency and environmental impact, even after mechanical damages.

The expression "hydrophilic moiety" means a moiety that is attracted to, and has a strong affinity to water or other polar solvents. More particularly, the moiety tends to be dissolved by water or other polar solvents.

The expression "amphiphilic compound" means a compound comprising both hydrophilic and hydrophobic properties. More particularly, the amphiphilic compound comprises a lipophilic moiety (i.e. a lipophilic group) and a hydrophilic moiety (i.e. a hydrophilic group).

The expression "lipophilic moiety" (i.e. "hydrophobic moiety"), contrary to "hydrophilic moiety", means a moiety that is attracted to, and has a strong affinity to fats, oils, lipids or non-polar solvents such as hexane or toluene. More particularly, the moiety tends to be dissolved by fats, oils, lipids or non-polar solvents such as hexane or toluene.

The Polymer Matrix A

The polymer matrix A comprises at least one polymer commercially available and suitable for the preparation of the polymeric composition.

More particularly, the polymer matrix is constituted by all the polymers which are included in the polymeric composition, except polymer(s) which are used as amphiphilic compound (i.e. polymeric amphiphilic compound).

The polymer matrix A can comprise at least one olefin polymer, and more preferably at least one olefin polymer with hydrophilic moiety, said polymer being obtained from at least one olefin monomer.

The term "polymer" means all types of polymers well-known in the art, such as homopolymer, or copolymer such as block copolymer, random copolymer, alternative copolymer or terpolymer.

The polymer of the present invention can be a thermoplastic or an elastomer, which can be cross-linked by technic well-known in the art.

The olefin polymer can advantageously be a polymer of ethylene which can be selected among ethylene vinyl acetate copolymer (EVA), ethylene-propylene-diene terpolymer (EPDM), and a mixture thereof.

More preferably, the polymer matrix A includes more than 50% by weight of olefin polymer(s), more preferably at least 70% by weight of olefin polymer(s), and more preferably at least 90% by weight of olefin polymer(s), over the total weight of the polymer matrix A (i.e. the total weight of polymer(s) in the polymeric composition).

More preferably, the polymer matrix A includes more than 50% by weight of olefin polymer(s) with hydrophilic moiety, more preferably at least 70% by weight of olefin polymer(s) with hydrophilic moiety, and more preferably at least 90% by weight of olefin polymer(s) with hydrophilic moiety, over the total weight of the polymer matrix A (i.e. the total weight of polymer(s) in the polymeric composition).

In a particular embodiment, the polymer matrix A is only composed of one or several olefin polymer(s) according to the invention. More preferably, the polymer matrix A is only composed of one or several olefin polymer(s) with hydrophilic moiety according to the invention.

The hydrophilic moiety of the olefin polymer can contain polar functional groups, which can be selected among hydroxyl, amide, ester, carbonate, ether, ketone, urethane, urea and nitrile groups The preferred hydrophilic moiety of the olefin polymer is vinyl acetate.

The content of hydrophilic moiety in the olefin polymer can be of at least 20% by weight, more preferably at least 40% by weight, and even more preferably at least 60% by weight. The hydrophilic moiety content can classically be determined by Fourier transform infrared (FTIR) spectroscopy.

By way of example, the olefin polymer with hydrophilic moiety can be an ethylene copolymer with hydrophilic moiety, such as for example an ethylene vinyl acetate copolymer (EVA).

In a particular embodiment, the olefin polymer with hydrophilic moiety is a non-grafted olefin polymer. For example, the olefin polymer with hydrophilic moiety may not be a maleic anhydride grafted EVA.

The polymeric composition can comprise at least 30% by weight of the polymer matrix A, more preferably more than 50% by weight of the polymer matrix A, and more preferably at least 60% by weight of the polymer matrix A, over the total weight of the polymeric composition.

More particularly, the polymeric composition can comprise at least 30% by weight of ethylene vinyl acetate copolymer (EVA), more preferably more than 50% by weight of EVA, and more preferably at least 60% by weight of EVA, over the total weight of the polymeric composition.

The Amphiphilic Compound B

The amphiphilic compound, used more preferably as a self-healing agent, in the polymeric composition, is able to form intermolecular interactions with the olefin polymer, and more preferably with the olefin polymer with hydrophilic moiety, during the healing process.

Intermolecular interactions can be selected among dipole-dipole interactions, hydrogen bonds interactions, ionic bonds interactions, and any combination thereof.

In a preferred embodiment, the amphiphilic compound and the olefin polymer with hydrophilic moiety are compatible together. More particularly, the amphiphilic compound and the olefin polymer with hydrophilic moiety are miscible together at a mixing temperature where the olefin polymer with hydrophilic moiety is in a malleable state. The malleable state of a polymer is well-known in the art and depends on its melting temperature (e.g. molten state) and/or its glass transition temperature.

More particularly, said miscible property can be defined by the Hildebrand solubility parameter (δ) well-known in the art, which is a numerical estimate of the degree of interaction between materials, expressed in (calories per $cm^3)^{1/2}$.

The Hildebrand solubility parameter (δ) is the square root of the cohesive energy density that is classically determined by measuring the heat of vaporization, in calories per cubic centimeter of liquid. The experimental estimation of the solubility parameters of slightly volatile compounds can be done by several techniques well-known in the art, such as by swelling tests (Schenderlein et al., 2004), by turbidimetric titration (Schenderlein et al., 2004; Wang, 2003), by viscosity measurements (Wang, 2003) or by inverse gas chromatography (IGC) (Tian and Munk, 1994; Adamska et al., 2008; Sreekanth and Reddy, 2008).

The amphiphilic compound can have a Hildebrand solubility parameter (δ) which is more or less 20% of the Hildebrand solubility parameter of the olefin polymer with hydrophilic moiety, more preferably more or less 10% of the Hildebrand solubility parameter of the olefin polymer with hydrophilic moiety, and even more preferably more or less 5% of the Hildebrand solubility parameter of the olefin polymer with hydrophilic moiety. In a preferred embodiment, the amphiphilic compound can have a Hildebrand solubility parameter substantially equal to the Hildebrand solubility parameter of the olefin polymer with hydrophilic moiety.

The amphiphilic compound of the invention can comprise:
an aliphatic chain, saturated or unsaturated, comprising at least four carbon atoms, as lipophilic moiety, and
a hydrophilic moiety.

The lipophilic moiety can comprise up to 28 carbon atoms in the aliphatic chain. More preferably, it can comprise an aliphatic chain between 8 to 20 carbon atoms.

The hydrophilic moiety can be an ionic moiety or a non-ionic moiety.

The hydrophilic moiety can be selected among carboxylic acids, precursors of carboxylic acids (e.g. anhydrides), ionic form of carboxylic acids (e.g. carboxylates), esters, amines, amides, alcohols, any derivative thereof, and any combination thereof.

The amphiphilic compound can be a polymeric compound or a non-polymeric compound. More particularly, the amphiphilic compound is different from the olefin polymer with hydrophilic moiety of the polymer matrix A.

In the present invention, the expression "non-polymeric compound" corresponds to a compound which is not a molecule whose structure is composed of multiple repeating monomeric units, identical or different, linked covalently together, and created via polymerization of one or several of said monomeric units.

In a first variant, the amphiphilic compound can be a polymeric compound selected among grafted olefin polymers, polymers with hydrophilic moieties, and any derivative thereof.

Grafted olefin polymers can be maleic anhydride (MAH) grafted olefin polymers (e.g. MAH grafted EVA), or maleic anhydride (MAH) grafted polybutadiene. The hydrophilic moiety of the polymer in said first variant can contain polar functional groups, which can be selected among hydroxyl, amide, ester, carbonate, ether, ketone, urethane, urea and nitrile groups? For example, polymers with hydrophilic moieties can be selected among polyethylene glycols and polyester polyols such as polycaprolactones and adipic acid polyesters.

In a second variant, the amphiphilic compound can be a non-polymeric compound selected among carboxylic acid amphiphiles, amine amphiphiles, amide amphiphiles, alcoholic amphiphiles, ester amphiphiles, ether amphiphiles, derivatives and any combination thereof.

By way of examples of non-polymeric compound,
carboxylic acid amphiphiles or derivatives can be fatty acids, fatty acid metal salts, dodecanedioic acid, zinc stearate, stearic acid, or a mixture thereof;
amine amphiphiles or derivatives can be fatty acid amines, fatty acid amine metal salts, stearyl amine, 1,12-diaminododecane, or a mixture thereof;
amide amphiphiles or derivatives can be fatty acid amides, fatty acid amide metal salts, stearic amide, or a mixture thereof;
alcoholic amphiphiles or derivatives can be fatty acids as defined thereafter, bearing at least one hydroxyl group;
ester amphiphiles or derivatives can be dioctyl sebacate, dibutyl sebacate, dioctyl adipate, dioctyl phthalate, di-n-hexyl phthalate, diamyl phthalate, dibutyl phthalate, or a mixture thereof;
ether amphiphiles or derivatives can be glycol ethers, such as ethylene and diethylene glycol monohexyl ethers, or ethylene, diethylene and triethylene glycol monobutyl ethers, or a mixture thereof.

More preferably, the non-polymeric compound can be advantageously selected among fatty acids and any derivative thereof, and more preferably among low molecular weight fatty acids and any derivative thereof. For example, the non-polymeric compound can have a molecular weight from 100 g/mol to 2000 g/mol.

The expression "fatty acid" means a carboxylic acid with a long aliphatic chain, which is either saturated or unsaturated. More preferably, the fatty acid is a hydroxylated fatty acid with one or several double bond(s).

The aliphatic chain can comprise at least four carbon atoms, and more preferably until 28 carbon atoms.

Fatty acid or any derivative thereof can be selected among oleic acid, ricinoleic acid, and any derivative thereof.

Fatty acid or any derivative thereof can be selected among oil polyols, such as triglycerides. Triglyceride is classically a tri-ester of carboxylic acid and glycerin.

More preferably, the fatty acid can be an oleic derivative such as for example triglycerides of oleic acid, or a ricinoleic derivative such as for example triglycerides of ricinoleic acid.

Triglycerides can be found in vegetable oil. More particularly, the polymeric composition of the present invention can comprise a vegetable oil having a triglyceride structure. Said vegetable oil can be selected from the group consisting of a castor oil, a coconut oil, an olive oil, a palm oil, a soybean oil, and a mixture thereof.

Oleic acid or any derivative thereof can be easily found in commercially available products such as olive oil. Olive oil can contain oleic acid, linoleic acid and palmitic acid. By way of example, a classical olive oil can comprise from 55 to 83% by weight of oleic acid, 3.5 to 21% by weight of linoleic acid, and 7.5 to 20% by weight of palmitic acid, and have a Hildebrand solubility parameter ($\delta$) around 7.87 $(cal/cm^3)^{1/2}$.

Ricinoleic acid or any derivative thereof can be easily found in commercially available products such as castor oil. Castor oil can contain ricinoleic acid, oleic acid and linoleic acid, and is composed of triglyceride of ricinoleic acid. By way of example, a classical castor oil can comprise from 85 to 95% by weight of ricinoleic acid, 2 to 6% by weight of oleic acid, and 1 to 5% by weight of linoleic acid, with a content of 70-90% by weight of triglycerides of ricinoleic acid (i.e. tri-ester of ricinoleic acid and glycerin). Castor oil has a Hildebrand solubility parameter ($\delta$) around 8.90 $(cal/cm^3)^{1/2}$.

In a particular embodiment, the polymeric composition can comprise at least two amphiphilic compounds B according to the invention, and more preferably two non-polymeric amphiphilic compounds.

The polymeric composition can comprise an appropriate amount of one or several amphiphilic compound(s) according to the invention, in order to obtain the desired mechanical properties and self-healing efficiency.

For example, the total amount of amphiphilic compound(s) B in the polymeric composition can be from 0.1 to 100 parts by weight with respect to 100 parts by weight of polymer matrix A, more preferably from 5 to 80 parts by weight with respect to 100 parts by weight of polymer matrix A, more preferably from 10 to 60 parts by weight with respect to 100 parts by weight of polymer matrix A, and even more preferably from 20 to 50 parts by weight with respect to 100 parts by weight of polymer matrix A. In a preferred embodiment, the total amount of amphiphilic compound(s) B in the polymeric composition can be at least 20 parts by weight with respect to 100 parts by weight of polymer matrix A.

In the present invention, when the compound amounts are expressed according to 100 parts by weight of the polymer matrix A, the polymer(s) included in said polymer matrix A are different from the amphiphilic compound B when the latter is under the form of a polymer.

The amount of amphiphilic compound(s) B in the polymeric composition can be expressed in percent by weight over the total weight of the polymeric composition. More particularly, this embodiment is very useful to keep a good viscosity of the polymeric composition in order to optimize the self-healing properties at 80° c. and below 80° C.

By way of example, the polymeric composition can comprise at least 10% by weight of amphiphilic compound(s) B, and more preferably at least 15% by weight of amphiphilic compound(s) B, and even more preferably 20% by weight of amphiphilic compound(s) B, over the total weight of the polymeric composition. In a particular embodiment, the polymeric composition can comprise up to 70% by weight of amphiphilic compound(s) B, and more preferably up to 60% by weight of amphiphilic compound(s) B, and even more preferably up to 50% by weight of amphiphilic compound(s) B, over the total weight of the polymeric composition.

In a particular embodiment, the self-healing additive(s) includes in the polymeric composition of the present invention, to obtain the self-healing material, are only selected among one or several amphiphilic compounds.

Particular Embodiments of the Polymeric Composition

In a preferred embodiment, the polymeric composition of the invention can comprise:

A. a polymer matrix comprising at least one ethylene vinyl acetate copolymer with a vinyl acetate moiety content of at least 40% by weight, and B. at least 30 parts by weight of the amphiphilic compound(s) B (i.e. the total amount of amphiphilic compound(s) B in the polymeric composition) with respect to 100 parts by weight of polymer matrix A.

Said preferred embodiment allows to obtain a cross-linked material with a tensile strength healing index and/or an elongation at break healing index, at 80° C. during 48 h with an applied pressure of 2.8 kPa, of 100%.

Cross-Linking Polymeric Composition

The polymeric composition of the invention can advantageously be halogen-free and/or silicone-free.

The polymeric composition of the present invention can be easily extruded around the elongated conducting element, by well-known technics in the art.

The polymeric composition of the present invention can be cross-linked by well-known technics in the art, such as peroxide cross-linking, e-beam cross-linking, silane cross-linking, sulfur cross-linking, or UV crosslinking.

The polymeric composition can comprise an appropriate amount of one or several cross-linking agent(s) (i.e. more than 0 part by weight of cross-linking agent(s) with respect to 100 parts by weight of the polymer matrix A), in order to obtain a cross-linked material.

The preferred cross-linking method is the peroxide cross-linking. In this respect, the polymeric composition can further comprise an organic peroxide as cross-linking agent. One example of the crosslinking agent is a peroxide-based crosslinking agent commercially available, and may include bis(t-butylperoxyisopropyl)benzene (PBP-98).

By way of example, the polymeric composition can comprise from 0.1 to 10 parts by weight of cross-linking agent(s) with respect to 100 parts by weight of the polymer matrix A, and more preferably from 1.0 to 10 parts by weight of cross-linking agent(s) with respect to 100 parts by weight of the polymer matrix A, and more preferably from 1.0 to 3.0 parts by weight of cross-linking agent(s) with respect to 100 parts by weight of the polymer matrix A.

In the present invention, the term "cross-linked" means that the gel content according to the ASTM D2765-01 standard is superior to 40%, more preferably superior to 60%, and more preferably superior to 70%.

Additives

The polymeric composition of the present invention may further comprise organic additives and/or inorganic additives.

The organic additives may include, but are not limited to, antioxidants, stabilizers, plasticizers, softeners, extenders, pigments, coupling agents, flame retardants (such as for example metal hydroxides), crosslinking aid agents, crosslinking catalyst, UV protector, dyes, processing aids, tackifiers, peptisers, activators, and/or accelerators.

The inorganic additives may include, but are not limited to, metal-based inorganic additives and ceramic-based inorganic additives, such as carbon black, calcium carbonate ($CaCO_3$), talc, china clay, graphite, silica, mica, antimony trioxide, lead oxide, aluminum hydroxide, magnesium hydroxide, magnesium oxide, zinc oxide.

Preferably, the content of the organic additives and/or the inorganic additives in the polymeric composition is in the range of 1 to 60 parts by weight with respect to 100 parts by weight of the polymer matrix A.

More particularly, the polymeric composition can comprise from 0.1 to 10 parts by weight of antioxidant(s) with respect to 100 parts by weight of the polymer matrix A, and more preferably from 0.5 to 10 parts by weight of antioxidant(s) with respect to 100 parts by weight of the polymer matrix A.

Fillers

—Flame Retardant Fillers:

The polymeric composition can further comprise at least one flame retardant filler.

For example, the flame retardant filler can be selected among metallic hydroxide fillers such as aluminum trihydroxide (ATH), magnesium dihydroxide (MDH), or a mixture thereof.

The amount of flame retardant filler(s) in the polymeric composition, and more generally the amount of filler(s) in the polymeric composition, is advantageously limited not to increase the viscosity of the polymeric composition, so that optimizing more particularly the self-healing properties.

The content of flame retardant filler in the polymeric composition can be less than 40% by weight, and preferably less than 20% by weight, and even more preferably less than 10% by weight, over the total weight of the polymeric composition.

The content of flame retardant filler in the polymeric composition can be less than 100 parts by weight, and more preferably less than 50 parts by weight, with respect to 100 parts by weight of the polymer matrix A.

In a particular embodiment, the polymeric composition does not comprise said flame retardant filler.

—Nanofillers:

The polymeric composition can further comprise at least one nanofillers as described thereafter in the present description.

In a first embodiment, the content of nanofiller is 1 to 10 parts by weight with respect to 100 parts by weight of the polymer matrix A.

In a second embodiment, the polymeric composition does not comprise nanofiller as described in the present description, and more particularly the polymeric composition does not comprise POSS and organonanoclay.

In a particular embodiment regarding the amount of filler(s) and additive(s) as mentioned above, the polymeric composition can comprise up to 100 parts by weight of said additive(s) and said filler(s), and more preferably up to 50 parts by weight of said additive(s) and said filler(s), with respect to 100 parts by weight of the polymer matrix A, in order to optimize the self-healing properties.

In a particular embodiment, the polymeric composition can comprise other compound(s), such as said additive(s) and said filler(s) or other(s), in an amount which can be up to 100 parts by weight of said other compound(s), and more preferably up to 50 parts by weight of said other compound(s), with respect to 100 parts by weight of the polymer matrix A, in order to optimize the self-healing properties. Said other compound(s) are different from the polymer matrix A and the amphiphilic compound(s) B, so that said other compounds can be all the compounds included in the polymeric composition except the polymer matrix A and the amphiphilic compound(s) B.

The Cable and the Self-Healing Material

In the present invention, the term "cable" indicates an electric cable and/or an optic cable, including at least one elongated electrically conducting element and/or one elongated optically conducting element.

The self-healing material can surround one or several elongated conducting element(s), insulated or not, along the cable.

In particular, the elongated conducting element can be in a central position in the cable.

The elongated conducting element can be a single core conductor such as an electrical wire, or a multicore conductor such as a plurality of wires.

When the elongated conducting element is an elongated electrically conducting element, the latter can be made from a metallic material such as one selected among aluminum, aluminum alloy, copper, copper alloy, and any combination thereof.

The cross-linked material of the invention can advantageously be an extruded material, such as an extruded material along the elongated conducting element.

The self-healing cross-linked material can be a material selected among an insulating layer, a protecting jacket, a bedding, and any combination thereof. The bedding aims usually at filling voids inside the cable.

The self-healing cross-linked material can be a layer physically in direct contact with said elongated conducting element, an intermediate layer around the elongated conducting element, or the outermost layer of the cable.

Depending of the electrical properties wanted around the elongated conducting element of the cable, the cross-linked material can be an electrically conductive material, a semiconductive material or an electrically insulating material.

Furthermore, in the polymeric composition as well as in the cross-linked material (final product), the amphiphilic compound B is not able to chemically react with the olefin polymer with hydrophilic moiety, in order to form covalent bonds between the amphiphilic compound B and the olefin polymer with hydrophilic moiety. This characteristic advantageously allows to preserve the cross-linked network and the mechanical properties of the cross-linked material even if said material is subjected to damage.

Another object of the present invention is a process of manufacturing the cable according to any of the preceding claims, characterized in that the process comprises the following steps:

i. mixing the polymeric composition;

ii. applying the mixed polymeric composition around the elongated conducting element; and iii. cross-linking the polymeric composition of step ii, to obtain the cross-linked material surrounding the elongated conducting element.

The mixing step i can be done at an appropriate temperature to render the polymer matrix malleable, depending on its melting temperature (e.g. molten state) and/or its glass transition temperature, in order to obtain a homogeneous mixture between the polymer matrix and the amphiphilic compound(s) incorporated into the polymer matrix. Alternatively, a polymeric master-batch of the amphiphilic compound(s) can be firstly prepared, and then incorporated in the polymer matrix A.

The step ii can consist in extruding the polymeric composition around the elongated conducting element, thanks to an extruder. Usually at the outside of the extruder, the extruded polymeric composition is substantially not cross-linked.

The steps i and ii can advantageously be done at a temperature which is not sufficient to crosslink the olefin polymer with hydrophilic moiety.

In the present invention, the term "not cross-linked" means that the gel content according to the ASTM D2765-01 standard is inferior to 20%, more preferably inferior to 10%, more preferably inferior to 5%, and more preferably of 0%.

The cross-linking step iii can be done for example by heating the applied polymeric composition of step ii, when the composition includes an organic peroxide as cross-linking agent. But other types of crosslinking reactions well-known in the art can be involved in the scope of the present invention.

Polymeric Composition with Nanofiller

Another object of the present invention is a polymeric composition, which can be used as a self-healing material, said polymeric composition comprising:

A. a polymer matrix, as described previously in the description,

B. at least one amphiphilic compound, as described previously in the description, and C. at least one nanofiller, selected more particularly among POSS (Polyhedral Oligomeric Silsesquioxane), organonanoclay, and a mixture thereof.

Such type of polymeric composition including a nanofiller can be called a "nanocomposite composition".

A nanocomposite composition including POSS as nanofiller can be called by the terms "polymer-POSS nanocomposite", "nanocomposite of polymer-POSS" or "nanocomposite of polymer and POSS", and all these expressions have the same meaning, and are interchangeably.

A nanocomposite composition including organonanoclay as nanofiller can be called by the terms "polymer-organonanoclay nanocomposite", "nanocomposite of polymer-organonanoclay" or "nanocomposite of polymer and organonanoclay", and all these expressions have the same meaning, and are interchangeably.

The polymeric composition of the present invention is a crosslinkable composition in order to obtain a crosslinked product.

The nanocomposite composition including POSS as nanofiller is significantly enhanced in melt processability and mechanical properties and has no deterioration in the inherent properties of the polymer material itself, when compared to the conventional polymer-POSS nanocomposite which is not sufficiently improved in the desired properties of the polymer material even by the addition of a POSS commercially available.

More particularly, the present invention is related to a nanocomposite of polymer and POSS, which can comprise at least one amphiphilic dispersing agent selected from the group consisting of an amphiphilic carboxylic acid-based dispersing agent, an amphiphilic amine-based dispersing agent, a vegetable oil having a triglyceride structure, a process oil having an ester group, and a mixture thereof.

The nanocomposite composition including organonanoclay as nanofiller is significantly enhanced in melt processability, thermal properties and mechanical properties, when compared to the conventional polymer-organonanoclay nanocomposite which is deteriorated or is not sufficiently improved in the desired properties of the polymer material even by the addition of an organonanoclay commercially available.

More particularly, the present invention is related to a nanocomposite of polymer and organonanoclay, which can comprise:

(b1) an amphiphilic dispersing agent selected from the group consisting of an amphiphilic carboxylic acid-based dispersing agent, an amphiphilic amine-based dispersing agent, and a mixture thereof; and (b2) an amphiphilic oil selected from the group consisting of a vegetable oil having a triglyceride structure, a process oil having an ester group, and a mixture thereof.

The polymer(s) used in the polymer matrix A of the nanocomposite composition can be more particularly at least one polymer material commercially available and suitable for preparation of a polymer-POSS nanocomposite or a polymer-organonanoclay nanocomposite.

Particularly, ethylene-propylene-diene terpolymer (EPDM) and ethylene-vinyl acetate (EVA) copolymer are representative polymer materials for rubber which have a low degree of crystallization such that they are physically miscible with POSS and/or organonanoclay, even at a relatively low temperature, and which can be also crosslinked by a peroxide-based crosslinking agent commercially available.

The EPDM is one of polymer materials having a low polarity, whereas the EVA with vinyl acetate (VA) content of 45 wt % is one of polymer materials having a high polarity. As will be described later, the inventors used EPDM and EVA as a polymer material and confirmed the effects thereof in the examples. Thus, it can be considered that the nanocomposite composition according to the present invention is applicable to most of the polymer materials irrespective of their polarity (i.e. independently of their polarity).

In addition, the EPDM is used for hoses, heat-resistant belts, weather strip body/door seals, gaskets, waterproof sheets, insulators for wire, etc., and the EVA is used for package materials for foods and industrial use, greenhouse films, interior materials for footwear, photovoltaic cell encapsulations, wire coatings, etc.

Furthermore, the POSS is a nanofiller that is added to the polymer material to enhance the desired properties of the polymer material, such as mechanical properties, fire resistance, melt processability, and the like.

Therefore, it is expected that the nanocomposite of polymer-POSS or the nanocomposite of polymer-organonanoclay according to the present invention can provide a product with more excellent properties in various terms of the whole industrial fields aforementioned.

The nanocomposite composition can be also used in a cable as defined in the present invention, as a material, more particularly as a self-healing material, surrounding an elongated conducting element.

In the nanocomposite composition of the invention, the amphiphilic compound B can be used as a self-healing agent as defined in the present invention.

The nanocomposite composition including POSS as nanofiller can comprise at least one amphiphilic dispersing agent selected from the group consisting of an amphiphilic carboxylic acid-based dispersing agent, an amphiphilic amine-based dispersing agent, a vegetable oil having a triglyceride structure, a process oil having an ester group, and a mixture thereof.

There is a common characteristic that they are fatty acids or fatty acid derivatives having both a hydrophobic group and a hydrophilic group in one molecule.

In one preferred embodiment, the amphiphilic carboxylic acid-based dispersing agent is selected from the group consisting of a fatty acid, a fatty acid metal salt and a mixture thereof. The fatty acid dispersing agent is preferably a saturated or unsaturated fatty acid such as palmitic acid, stearic acid (SAc), oleic acid, behenic acid, erucic acid, etc. The fatty acid metal salt dispersing agent is preferably a fatty acid metal salt such as zinc stearate (ZS), magnesium stearate, calcium stearate, etc. Said amphiphilic carboxylic acid-based dispersing agent may be used as one type alone, or in combination of at least two types.

In one preferred embodiment, the amphiphilic amine-based dispersing agent is a fatty acid derivative having a functional group such as amide or amine. Preferably, the amphiphilic amine-based dispersing agent is selected from the group consisting of a fatty acid amine, a fatty acid amine metal salt, a fatty acid amide, a fatty acid amide metal salt, and a mixture thereof. The fatty acid amine or its metal salt is preferably stearyl amine (SA) or its metal salt. The fatty acid amide or its metal salt is preferably stearamide (SAm), ethylene-bis-stearamide, erucamide, oleamide, behenamide, or a metal salt thereof. Said amphiphilic amine-based dispersing agent may be used as one type alone, or in combination of at least two types.

The vegetable oil used in the present invention can refer to an amphiphilic process oil which is in the liquid phase at the room temperature and contains a fatty acid ester, triglyceride, as a principal component. In one preferred embodiment, the vegetable oil is selected from the group consisting of a castor oil (CSO), a coconut oil (CCO), an olive oil (OLO), a palm oil, a soybean oil, and a mixture thereof. Said vegetable oil may be used as one type alone, or in combination of at least two types.

The process oil used in the present invention can refer to an amphiphilic process oil which is in the liquid phase at the room temperature and has an ester functional group. Examples of the process oil may be selected from the group consisting of dioctyl sebacate (DOS), dibutyl sebacate, dioctyl adipate, dioctyl phthalate, di-n-hexyl phthalate, diamyl phthalate, dibutyl phthalate, and a mixture thereof. Said process oil may be used as one type alone, or in combination of at least two types.

In another preferred embodiment, the amphiphilic carboxylic acid-based dispersing agent, the amphiphilic amine-based dispersing agent, the vegetable oil and the process oil are used independently of each other, or in combination thereof.

In one preferred embodiment, the content of the amphiphilic dispersing agent in the POSS nanocomposite, is 1 to 50 parts by weight, more preferably 5 to 25 parts by weight, even more preferably 5 to 15 parts by weight, with respect to 100 parts by weight of the polymer matrix A.

The nanocomposite composition including organonanoclay as nanofiller can comprise:

(b1) at least one amphiphilic dispersing agent selected from the group consisting of an amphiphilic carboxylic acid-based dispersing agent, an amphiphilic amine-based dispersing agent, and a mixture thereof; and (b2) at least one amphiphilic oil selected from the group consisting of a vegetable oil having a triglyceride structure, a process oil having an ester group, and a mixture thereof.

There is a common characteristic that the components (b1) and (b2) are fatty acids or fatty acid derivatives having both a hydrophobic group and a hydrophilic group in one molecule.

In one preferred embodiment, the amphiphilic carboxylic acid-based dispersing agent is selected from the group consisting of a fatty acid, a fatty acid metal salt, and a mixture thereof. The fatty acid dispersing agent is preferably a saturated or unsaturated fatty acid such as palmitic acid, stearic acid (SAc), oleic acid, behenic acid, erucic acid, etc. The fatty acid metal salt dispersing agent is preferably a fatty acid metal salt such as zinc stearate (ZS), magnesium stearate, calcium stearate, etc. Said amphiphilic carboxylic acid-based dispersing agent may be used as one type alone, or in combination of at least two types.

In one preferred embodiment, the amphiphilic amine-based dispersing agent is a fatty acid derivative having a functional group such as amide or amine. Preferably, the amphiphilic amine-based dispersing agent is selected from the group consisting of a fatty acid amine, a fatty acid amine metal salt, a fatty acid amide, a fatty acid amide metal salt, and a mixture thereof. The fatty acid amine or its metal salt is preferably stearyl amine (SA) or its metal salt. The fatty acid amide or its metal salt is preferably stearamide (SAm), ethylene-bis-stearamide, erucamide, oleamide, behenamide, or a metal salt thereof. Said amphiphilic amine-based dispersing agent may be used as one type alone, or in combination of at least two types.

In one preferred embodiment, the content of the component (b1) amphiphilic dispersing agent selected from the group consisting of an amphiphilic carboxylic acid-based dispersing agent, an amphiphilic amine-based dispersing agent, and a mixture thereof, is 1 to 20 parts by weight with respect to 100 parts by weight of the polymer matrix A, and more preferably 5 to 20 parts by weight with respect to 100 parts by weight of the polymer matrix A.

The vegetable oil used in the present invention can refer to an amphiphilic process oil which is in the liquid phase at the room temperature and contains a fatty acid ester, triglyceride, as a principal component. In one preferred embodiment, the vegetable oil is selected from the group consisting of a castor oil (CSO), a coconut oil (CCO), an olive oil (OLO), a palm oil, a soybean oil, and a mixture thereof. Said vegetable oil may be used as one type alone, or in combination of at least two types.

The process oil used in the present invention can refer to an amphiphilic process oil which is in the liquid phase at the room temperature and has an ester functional group. Examples of the process oil may be selected from the group consisting of dioctyl sebacate (DOS), dibutyl sebacate, dioctyl adipate, dioctyl phthalate, di-n-hexyl phthalate, diamyl phthalate, dibutyl phthalate, and a mixture thereof. Said process oil may be used as one type alone, or in combination of at least two types.

In one preferred embodiment, the content of the component (b2) amphiphilic oil selected from the group consisting of a vegetable oil having a triglyceride structure, a process oil having an ester group, and a mixture thereof, is 1 to 20 parts by weight with respect to 100 parts by weight of the polymer matrix A, and more preferably 5 to 20 parts by weight with respect to 100 parts by weight of the polymer matrix A.

In the organonanoclay nanocomposite, both the component (b1) amphiphilic dispersing agent and the component (b2) amphiphilic oil should be comprised in the nanocomposite. If a nanocomposite does not comprise any one of the components (b1) and (b2), it shows poor effects in overall view of melt processability, mechanical properties and thermal stability.

The Nanofiller C

The nanofillers have larger surface area that allows interaction with the polymer material per unit volume compared with the micro-fillers having a size of several micrometers to several hundreds of micrometers. Thus, even a relatively small quantity of nanofillers added to the polymer material can improve the desired properties of the polymer material to the equivalent level to the micro-fillers. Accordingly, one can prepare a high-performance polymer nanocomposite by improving the inherent properties of the polymer material such as melt processability, flexibility, elasticity or lightweight. Nanofillers generally having a size of 100 nm or less can be used.

POSS as Nanofiller

Polyhedral oligomeric silsesquioxane (POSS) has been used as one of the nanofillers. The POSS is a silica nanoparticle that has a three-dimensional structure composed of silicon-oxygen (—Si—O—) bonds and contains a hydrogen atom or an organic functional group as a substituent bonded to the silicon (Si) atom. The diameter of the POSS nanoparticle is in the range of 1 to 3 nm depending on the type of the organic functional group substituent bonded to the silicon (Si).

The POSS used in the present invention is a component acting as a nanofiller, and can have a structure with appropriate organic functional groups as a substituent bonded to silicone (Si).

In a preferred embodiment, the POSS can be a POSS with a polar group substituent.

For example, POSS of the present invention may include, but is not limited to, POSS commercially available from Hybrid Plastics Inc.

The representative POSSs are as follows:
Aminopropylisooctyl POSS (AM0270): a caged POSS in which eight silicon atoms are substituted with one —(CH$_2$)$_3$—NH$_2$ and seven isooctyl groups;
Glycidyl POSS cage mixture (EP0409): a caged POSS in which eight silicon atoms are substituted with eight propylglycidyl ether groups;
Octaisobutyl POSS (MS0825): a caged POSS in which eight silicon atoms are substituted with eight isobutyl groups; and Tetrasilanolphenyl POSS (SO1460): a partially caged POSS in which four silicon atoms are substituted with four phenyl groups and another four silicone atoms are substituted with phenyl groups and hydroxyl groups.

In one preferred embodiment, the content of POSS is 1 to 10 parts by weight with respect to 100 parts by weight of the polymer matrix A.

Organonanoclay as Nanofiller

The organonanoclay used in the present invention refers to organonanoclays wherein inorganic cations between layers of natural nanoclay are substituted with amphiphilic organic cations such as quaternary alkyl ammonium cations. For example, it may include, but is not limited to, organonanoclays commercially available from Laviosa Chemica Mineraria S.p.A. or Southern Clay Products Inc.

The representative organonanoclays derived from natural phyllosilicate based montmorillonite (MMT) are as follows:
an organonanoclay modified by ammonium salt having dimethyl, dihydrogenated tallow groups (Dellite 67G, $d_{(001)}$-spacing being determined by wide angle X-ray scattering technique, $d_{(001)}$=3.48 nm);
an organonanoclay modified by ammonium salt having dimethyl, dihydrogenated tallow groups (Cloisite 15, $d_{(001)}$=3.63 nm);
an organonanoclay modified by ammonium salt having dimethyl, dihydrogenated tallow groups (Cloisite 20, $d_{(001)}$=3.16 nm);
an organonanoclay modified by ammonium salt having methyl, tallow, bis-2-hydroxyethyl groups (Cloisite 30B, $d_{(001)}$=1.85 nm); and
an organonanoclay modified by ammonium salt having methyl, dihydrogenated tallow groups (Cloisite 93A, $d_{(001)}$=2.36 nm).

Each layer of MMT is a multi-layered structure, having more particularly one octahedral sheet composed of aluminum and magnesium hydroxides located between two silica tetrahedral sheets, and alkaline and alkaline-earth cations are intercalated between crystal layers.

In one preferred embodiment, the content of organonanoclay is 1 to 10 parts by weight with respect to 100 parts by weight of the polymer matrix A.

The nanocomposite composition can be a crosslinking polymeric composition as described previously in the present description.

The nanocomposite composition can further comprise at least one or several additives as described previously in the description.

The nanocomposite composition can comprise a crosslinking agent as described previously in the present description.

The nanocomposite composition according to the present invention can be prepared by mechanically mixing the polymer material, the nanofiller, the amphiphilic compound, such as the amphiphilic dispersing agent and optionally the amphiphilic oil, at a predetermined weight ratio through a two-roll mill. The crosslinking agent, the organic additives and/or the inorganic additives aforementioned may be additionally added to said mixture depending on the particular properties industrially required to the nanocomposite.

In particular, when the nanocomposite composition is prepared by further adding a crosslinking agent, it can be subjected to a compression and crosslinking process in a mold at high temperature, and then form a crosslinked product of the nanocomposite composition.

The amphiphilic dispersing agents used in the polymer-POSS nanocomposite according to the present invention are mostly organic substances commercially available at low cost and harmless to the human body. These amphiphilic dispersing agents have a low molecular weight in relation to the polymer matrix, and thus can lower the viscosity of the polymer material and increase the melt processability.

Moreover, the nanocomposite of the present invention can significantly enhance the mechanical properties even though the POSS as a nanofiller is added in only a small amount. At the same time, there are not deteriorations in the inherent properties of the polymer material that can be caused by the addition of the POSS and the amphiphilic dispersing agent.

The amphiphilic dispersing agents and the amphiphilic oils used in the polymer-organonanoclay nanocomposite according to the present invention are mostly organic substances commercially available at low cost and harmless to the human body.

They have a low molecular weight in relation to the polymer matrix, and thus can lower the viscosity of the polymer material. In addition, they are intercalated between layers of organonanoclay and increase an interlayer distance, and thus facilitate an exfoliation of organonanoclay. Moreover, they provide hydrophobicity on the surface of organonanoclay, thereby enhancing the compatibility and dispersibility of the organonanoclay within a relatively low polar polymer matrix.

Thus, the nanocomposite and its crosslinked product of the present invention maintain a good melt processability of polymer matrix itself, while at the same time showing remarkably improved mechanical properties and thermal stability, in comparison with the nanocomposite not comprising any one of the amphiphilic dispersing agents and the amphiphilic oils.

Furthermore, the nanocomposite and its crosslinked product according to the present invention can be well-compatible with the usual process for preparing a conventional polymer or rubber composite or its crosslinked product, and are also applicable to most of the polymer materials irrespective of the polarity. Accordingly, the present invention has an advantage that is available for large-scaled production and applicable in a wide range of applications.

The present invention will become more fully understood from the examples given herein below and from the drawings, which are given by way of illustration only, and thus which are not limits of the present invention, and wherein:

BRIEF DESCRIPTION OF THE DRAWINGS:

FIG. 1a represents the healing test procedure related to a double-layer overlapping;

FIG. 1b represents the healing test procedure related to an end-to-end attachment; and FIG. 2, wherein the left of FIG. 2 shows an FE-SEM (Field Emission Scanning Electron Microscope) image of a polymer-POSS nanocomposite comprising an amphiphilic dispersing agent according to the present invention; and the right of FIG. 2 illustrates a POSS nano-aggregate having a size of several tens of nanometers which is formed together with the amphiphilic dispersing agent according to the present invention within a polymer matrix. This structure illustration was made based on the experimental results by the inventors. As seen in FIG. 2, the amphiphilic dispersing agent according to the present invention ensures the POSS not to form an aggregate having a size reaching to several micrometers. In addition, it provides hydrophobicity on the surface of the POSS nano-aggregate, thereby enhancing the compatibility and dispersibility of the POSS nano-aggregate within the polymer matrix.

DETAILED DESCRIPTION

1. Polymeric Compositions without Nanofiller 1.1. Preparation of the Polymeric Composition without Nanofiller Different compositions according to the present invention have been prepared and are gathered in the Table 1 as below.

The amounts in Table 1 are expressed in parts by weight with respect to 100 parts by weight of the polymer matrix. In Table 1, the polymer matrix is only constituted by a copolymer of ethylene vinyl acetate (Polymers A1, A2 or A3).

TABLE 1

| Polymeric Compositions | C1 | C2 | C3 | C4 | C5 | C6 | C7 | C8 | C9 | C10 |
|---|---|---|---|---|---|---|---|---|---|---|
| Polymer A1: EVA28 | 100 | 100 | 0 | 0 | 0 | 0 | 0 | 0 | 0 | 0 |
| Polymer A2: EVA45 | 0 | 0 | 100 | 0 | 100 | 100 | 0 | 100 | 100 | 100 |
| Polymer A3: EVA70 | 0 | 0 | 0 | 100 | 0 | 0 | 100 | 0 | 0 | 0 |
| Self-healing additive B1 | 0 | 10 | 10 | 10 | 0 | 0 | 0 | 0 | 0 | 0 |
| Self-healing additive B2 | 0 | 10 | 20 | 10 | 0 | 0 | 0 | 10 | 0 | 20 |
| Self-healing additive B3 | 0 | 5 | 20 | 5 | 0 | 0 | 0 | 0 | 0 | 0 |
| Self-healing additive B4 | 0 | 5 | 10 | 5 | 0 | 0 | 0 | 0 | 0 | 0 |
| Self-healing additive B5 | 0 | 0 | 0 | 20 | 0 | 0 | 0 | 0 | 0 | 0 |
| Self-healing additive B6 | 0 | 0 | 0 | 0 | 20 | 0 | 0 | 0 | 0 | 0 |
| Self-healing additive B7 | 30 | 0 | 20 | 0 | 0 | 20 | 20 | 20 | 20 | 30 |
| Self-healing additive B8 | 0 | 0 | 0 | 0 | 0 | 0 | 0 | 0 | 10 | 0 |
| Self-healing additive B9 | 0 | 20 | 0 | 0 | 0 | 0 | 0 | 0 | 0 | 0 |
| Cross-linking agent | 2 | 2 | 2 | 2 | 2 | 2 | 2 | 2 | 2 | 2 |
| Additives | 3 | 3 | 3 | 3 | 3 | 3 | 3 | 3 | 3 | 3 |

The different compounds listed in Table 1 are as follows:

EVA28 is a copolymer of ethylene and vinyl acetate (EVA), commercialized by Arkema, under the reference Evatane 28-05, and having a vinyl acetate content around 28% by weight (Hildebrand solubility parameter ($\delta$)=8.5);

EVA45 is a copolymer of ethylene and vinyl acetate, commercialized by Dupont, under the reference Evaflex 45LX, and having a vinyl acetate content around 45% by weight (Hildebrand solubility parameter ($\delta$)=9.0);

EVA70 is a copolymer of ethylene and vinyl acetate, commercialized by Lanxess K.K., under the reference Levaprene 700HV, and having a vinyl acetate content around 70% by weight (Hildebrand solubility parameter ($\delta$)=9.3);

Self-healing additive B1 is a polymeric amphiphilic compound of maleic anhydride-grafted EVA, commercialized by DuPont, under the reference Fusabond 0190 (Hildebrand solubility parameter ($\delta$)=9.0 (cal/cm$^3$)$^{1/2}$);

Self-healing additive B2 is a non-polymeric amphiphilic compound of zinc stearate, commercialized by Han-il CHem Co., under the reference Zn-st (Hildebrand solubility parameter ($\delta$)=8.80 (cal/cm$^3$)$^{1/2}$);

Self-healing additive B3 is a non-polymeric amphiphilic compound of stearic amide, commercialized by Fine Organics, under the reference Finawax S (Hildebrand solubility parameter ($\delta$)=9.0 (cal/cm$^3$)$^{1/2}$);

Self-healing additive B4 is a non-polymeric amphiphilic compound of stearyl amine, commercialized by AkzoNobel, under the reference Armeen 18D (Hildebrand solubility parameter ($\delta$)=10.0 (cal/cm$^3$)$^{1/2}$);

Self-healing additive B5 is a non-polymeric amphiphilic compound of dioctyl sebacate, commercialized by Geo-Young, under the reference DOS (Hildebrand solubility parameter ($\delta$)=8.60 (cal/cm$^3$)$^{1/2}$);

Self-healing additive B6 is a non-polymeric amphiphilic compound of olive oil including a content of oleic acid of 55-83% by weight, commercialized by CJ CheilJedang Co. under the reference Olive oil (Hildebrand solubility parameter ($\delta$)=7.87 (cal/cm$^3$)$^{1/2}$);

Self-healing additive B7 is a non-polymeric amphiphilic compound of castor oil including a content of ricinoleic acid triglycerides of 85-95% by weight, commercialized by Dong Yang Oil Chemical, under the reference Casto oil (Hildebrand solubility parameter ($\delta$)=8.90 (cal/cm$^3$)$^{1/2}$);

Self-healing additive B8 is a non-polymeric amphiphilic compound of stearic acid, commercialized by LG Household & Health care, under the reference ST (Hildebrand solubility parameter ($\delta$)=7.74 (cal/cm$^3$)$^{1/2}$);

Self-healing additive B9 is a polymeric amphiphilic process aid of adipic acid polyester, commercialized by ADEKA Co., under the reference PN-1030 (Hildebrand solubility parameter ($\delta$)=10.0 (cal/cm$^3$)$^{1/2}$);

Cross-linking agent is an organic peroxide commercialized by NOF Co., under the reference PBP-98;

Additives is an antioxidant commercialized by RheinChemie, under the reference Rhenogran PCD-50.

1.2. Cross-Linked Materials Preparation

The polymeric compositions C1 to C10 of Table 1 are prepared to evaluate their self-healing efficiency.

In this respect, the process of preparation of said polymeric compositions is a follows:

In a first step, the constituents of each polymeric composition listed in Table 1 are mixed in a two-roll-mill at a temperature of 80° C.

Then in a second step, the mixed compositions are respectively cured in a compression mold at 170° C., in order to obtain cross-linked materials.

1.3. Healing Test Procedure

The healing test procedure concerns:

a first healing test as represented in FIG. 1a; and a second healing test as represented in FIG. 1b.

The first healing test is a "double-layer overlapping", with an applied pressure of 2.8 kPa at 80° C. or 23° C., during 48 h.

The second healing test is a "end-to-end attachment", with an applied pressure of 1.4 kPa at 80° C. or 23° C., during 48 h.

The healing effect is evaluated by the healing index described in the below Table 2:

TABLE 2

| | Tensile strength (TS) healing index (%) | Elongation at break (EB) healing index (%) |
|---|---|---|
| Healing index at room temperature | $\left(\frac{TS \text{ (after healing)}}{TS \text{ (initial)}}\right) \times 100$ at 23° C. | $\left(\frac{EB \text{ (after healing)}}{EB \text{ (initial)}}\right) \times 100$ at 23° C. |
| Healing index at hot temperature | $\left(\frac{TS \text{ (after healing)}}{TS \text{ Strength (initial)}}\right) \times 100$ at 80° C. | $\left(\frac{EB \text{ (after healing)}}{EB \text{ (initial)}}\right) \times 100$ at 80° C. |

Tensile strength (TS) and Elongation at break (EB) (absolutes values) are measured according to IEC 60811-1-1 standard.

More the healing index is high, more the self-healing property is optimized and rapid.

In the present invention, the tensile strength healing index (of the cross-linked material) with an applied pressure of 2.8 kPa at 80° C. during 48 h, with the double-layer overlapping test, is at least 30%, more preferably at least 50%, more preferably at least 80%, and even more preferably of 100%.

The elongation at break healing index (of the cross-linked material) with an applied pressure of 2.8 kPa at 80° C. during 48 h, with the double-layer overlapping test, is at least 30%, more preferably at least 50%, more preferably at least 80%, and even more preferably of 100%.

1.4. Mechanical Results

Results healing index of the compositions in Table 1 are gathered in the following Table 3, with healing test done with an applied pressure of 2.8 kPa at 80° C. during 48 h. The healing test used in Table 3 is the double-layer overlapping test.

TABLE 3

|  | C1 | C2 | C3 | C4 | C5 | C6 | C7 | C8 | C9 | C10 |
|---|---|---|---|---|---|---|---|---|---|---|
| Initial TS (MPa) | 17 | 7.4 | 1.7 | 1.3 | 8.2 | 13 | 3.2 | 4.0 | 4.2 | 2.1 |
| TS after healing at 80° C. (MPa) | 5.3 | 7.4 | 1.7 | 1.3 | 2.5 | 6.4 | 2.5 | 4.0 | 4.2 | 2.1 |
| TS Healing index (%) | 31 | 100 | 100 | 100 | 30 | 49 | 78 | 100 | 100 | 100 |
| Initial EB (%) | 730 | 550 | 680 | 820 | 840 | 960 | 1350 | 840 | 790 | 680 |
| EB after healing (%) at 80° C. | 510 | 550 | 680 | 820 | 710 | 830 | 1300 | 840 | 790 | 680 |
| EB Healing index (%) | 70 | 100 | 100 | 100 | 85 | 55 | 96 | 100 | 100 | 100 |

The compositions in Table 1 are also self-healing at room temperature (i.e. 23° C.). Some results of healing index are gathered in the following Table 4, with healing test done with an applied pressure of 2.8 kPa at 23° C. during 48 h. The healing test used in Table 4 is the double-layer overlapping test.

TABLE 4

|  | C2 | C3 | C5 | C7 | C8 | C10 |
|---|---|---|---|---|---|---|
| Initial TS (MPa) | 7.4 | 1.7 | 8.2 | 3.2 | 4.0 | 2.1 |
| TS after healing at 23° C. (MPa) | 2.0 | 0.27 | 0.57 | 1.0 | 0.67 | 0.55 |
| TS Healing index (%) | 27 | 16 | 7 | 31 | 17 | 26 |
| Initial EB (%) | 550 | 680 | 840 | 1350 | 840 | 680 |
| EB after healing (%) at 23° C. | 210 | 40 | 240 | 710 | 130 | 140 |
| EB Healing index (%) | 38 | 6 | 29 | 53 | 15 | 21 |

According to the results gathered in Tables 3 and 4, the cross-linked material of the present invention allows advantageously to provide an olefinic self-healing, preserving the cross-linked network and the mechanical properties of the material even if the cross-linked material is subjected to mechanical damage.

Indeed, for the polymeric compositions according to the invention with the healing test at 80° C. during 48 h, the tensile strength healing index is of at least 30%, and the elongation at break healing index is of at least 50% (see compositions C1 to C10 in Table 3).

And the tensile strength and elongation at break healing indexes, with the healing test at 23° C. during 48 h, related to compositions C2, C3, C5, C7, C8 and C10 (see Table 4), are of at least 6%.

2. Polymeric Composition with POSS as Nanofiller 2.1. Preparation of Nanocomposite And Its Crosslinked Product As a representative example of the process for preparing a polymer-POSS nanocomposite and its crosslinked product, a nanocomposite and its crosslinked product are prepared using the components and the mixing ratio as provided in Example 10 of Table 6, as follows:

Firstly, we mixed EPDM (KEP510, 5-ethylidene-2-norbornene content=5.7 wt %, ethylene content=71 wt %, available from Kumho Polychem Co., Inc.), POSS (EP0409), CaCO$_3$, stearylamine (SA) and olive oil (OLO) at the mixing ratio as given in Table 5 using a two-roll mill at 80° C. for 20 minutes.

To the resultant mixture was added a crosslinking agent (PBP-98), and then the mixing was carried out at the room temperature for additional 20 minutes. As a result, an EPDM-POSS nanocomposite was prepared.

Subsequently, the EPDM-POSS nanocomposite thus obtained was compressed under 12.5 MPa at 170° C., and then cross-linked for a period of time $t_{c90}$ defined below. As a result, a 2 mm-thick plate-shaped crosslinked product was made.

TABLE 5

|  | Components | phr | % by weight |
|---|---|---|---|
| Polymer matrix | EPDM | 100 | 77 |
| Nanofiller | POSS (EP0409) | 3 | 2.3 |
| Inorganic additive | calcium carbonate (CaCO$_3$) | 10 | 7.7 |
| Amphiphilic dispersing agent | stearylamine (SA) | 5 | 3.8 |
|  | olive oil (OLO) | 10 | 7.7 |
| Crosslinking agent | bis(t-butylperoxyisopropyl)benzene (PBP-98) | 2 | 1.5 |

In Tables 5 and 6, phr is an abbreviation of "parts per hundred parts of rubber", i.e. parts per hundred parts of the polymer matrix.

2.2. Evaluation Method for Melt Processability of Nanocomposite

In order to evaluate the melt processability of a polymer-POSS nanocomposite and measure the crosslinking temperature and time optimized for preparing a crosslinked product of polymer-POSS nanocomposite, a test using a moving die rheometer was carried out to determine the minimum torque value $S_{min}$ and the maximum torque value $S_{max}$ at a given temperature, and the time $t_{c90}$ taken to reach to 90% of the maximum torque value. The $S_{min}$ is in proportion to the viscosity before the crosslinking of the nanocomposite, and can be used as a parameter for relatively comparing the melt processability of the nanocomposite. It is considered that the lower $S_{min}$ represents the better melt processability.

2.3 Evaluation Method for Mechanical Properties of Crosslinked Product

The mechanical properties of the crosslinked product, such as tensile strength (TS) and elongation at break (EB), were determined by preparing dumbbell-shaped species as defined in the DIN 53504.S2 standard and then using a universal tensile strength tester under the condition as defined in the IEC 60811-1-1 standard. When both the values of the tensile strength and the elongation at break are higher, the mechanical properties are considered to be better on the whole.

2.4. Evaluation Method for Hardness and Flexibility of Crosslinked Product

The hardness of the crosslinked product was measured using a Shore durometer test under the condition as defined in the ASTM D2240 standard, and determined according to the Shore A scale. When the hardness value is lower, the crosslinked product is considered to have a higher flexibility.

2.5. Various Properties Determined Using Different Nanocomposites and Crosslinked Product Thereof Nanocomposites and their crosslinked products were prepared using the components and the mixing ratio as given in Table 6 according to the above-described preparation example. The meaning of the abbreviations described in Table 6 is as defined above in the present specification.

EVA was used as a polymer material having a high polarity, in order to compare with EPDM used as a polymer material having a low polarity. The EVA used herein was Evaflex 45LX (VA content=45 wt %, available from DuPont). In addition, the representative four POSS types aforementioned were used in order to evaluate the efficiency of the amphiphilic dispersing agent for the POSSs with different organic functional groups.

The nanocomposites and their crosslinked products thus obtained were determined on the melt processability, mechanical properties, hardness, etc. according to the above-described measurement methods. The results are presented in Table 6 below. The Examples in Table 6 marked by "*" denote the polymer-POSS nanocomposite comprising the amphiphilic dispersing agent according to the present invention. On the contrary, the Examples in Table 6 without a mark "*" denote the comparative example not belonging to the scope of the present invention.

TABLE 6

| Examples | Components | phr | $S_{min}$ (dNm) | TS (MPa) | EB (%) | Hardness (Shore A) |
|---|---|---|---|---|---|---|
| 1 | EPDM | 100 | 0.55 | 4.5 | 290 | 63 |
|   | CaCO₃ | 10 |  |  |  |  |
|   | PBP-98 | 2 |  |  |  |  |
| 2 | Components of Example 1 + | 112 | 0.67 | 3.6 | 290 | 60 |
|   | EP0409 | 3 |  |  |  |  |
| 3 | Components of Example 1 + | 112 | 0.42 | 4.4 | 380 | 66 |
|   | SA | 5 |  |  |  |  |
| 4* | Components of Example 2 + | 115 | 0.43 | 6.1 | 440 | 65 |
|   | SA | 5 |  |  |  |  |
| 5 | Components of Example 1 + | 112 | 0.47 | 3.0 | 330 | 54 |
|   | OLO | 5 |  |  |  |  |
| 6 | Components of Example 1 + | 112 | 0.44 | 5.6 | 600 | 57 |
|   | OLO | 10 |  |  |  |  |
| 7* | Components of Example 2 + | 115 | 0.47 | 3.9 | 470 | 54 |
|   | OLO | 5 |  |  |  |  |
| 8* | Components of Example 2 + | 115 | 0.44 | 7.8 | 660 | 55 |
|   | OLO | 10 |  |  |  |  |
| 9* | Components of Example 4 + | 120 | 0.35 | 5.5 | 600 | 57 |
|   | OLO | 5 |  |  |  |  |
| 10* | Components of Example 4 + | 120 | 0.34 | 12.6 | 840 | 60 |
|   | OLO | 10 |  |  |  |  |
| 11* | Components of Example 4 + | 120 | 0.25 | 10.2 | 1000 | 53 |
|   | OLO | 20 |  |  |  |  |
| 12* | Components of Example 1 + | 112 | 0.55 | 5.0 | 390 | 64 |
|   | EP0409 | 1 |  |  |  |  |
|   | SA | 1 |  |  |  |  |
|   | OLO | 2 |  |  |  |  |
| 13* | Components of Example 1 + | 112 | 0.35 | 12.9 | 790 | 59 |
|   | EP0409 | 1 |  |  |  |  |
|   | SA | 5 |  |  |  |  |
|   | OLO | 10 |  |  |  |  |
| 14* | Components of Example 1 + | 112 | 0.36 | 13.0 | 820 | 59 |
|   | EP0409 | 5 |  |  |  |  |
|   | SA | 5 |  |  |  |  |
|   | OLO | 10 |  |  |  |  |
| 15* | Components of Example 1 + | 112 | 0.31 | 12.7 | 850 | 58 |
|   | EP0409 | 10 |  |  |  |  |
|   | SA | 5 |  |  |  |  |
|   | OLO | 10 |  |  |  |  |
| 16* | EPDM | 100 | 0.39 | 13.5 | 850 | 61 |
|   | CaCO₃ | 20 |  |  |  |  |
|   | PBP-98 | 2 |  |  |  |  |
|   | EP0409 | 3 |  |  |  |  |
|   | SA | 5 |  |  |  |  |
|   | OLO | 10 |  |  |  |  |
| 17* | EPDM | 100 | 0.12 | 4.4 | 1030 | 55 |
|   | CaCO₃ | 20 |  |  |  |  |
|   | PBP-98 | 2 |  |  |  |  |
|   | EP0409 | 10 |  |  |  |  |
|   | SA | 20 |  |  |  |  |
|   | OLO | 20 |  |  |  |  |
| 18* | EPDM | 100 | 0.34 | 9.8 | 780 | 59 |
|   | PBP-98 | 2 |  |  |  |  |
|   | EP0409 | 3 |  |  |  |  |
|   | SA | 5 |  |  |  |  |
|   | OLO | 10 |  |  |  |  |
| 19* | Components of Example 1 + | 112 | 0.15 | 3.6 | 1060 | 50 |
|   | Al(OH)₃ | 50 |  |  |  |  |
|   | EP0409 | 10 |  |  |  |  |
|   | SA | 20 |  |  |  |  |
|   | OLO | 30 |  |  |  |  |
| 20 | Components of Example 1 + | 112 | 0.59 | 3.5 | 240 | 62 |
|   | AM0270 | 3 |  |  |  |  |
| 21* | Components of Example 20 + | 115 | 0.33 | 11.4 | 860 | 58 |
|   | SA | 5 |  |  |  |  |
|   | OLO | 10 |  |  |  |  |
| 22 | Components of Example 1 + | 112 | 0.64 | 3.5 | 220 | 64 |
|   | MS0825 | 3 |  |  |  |  |
| 23* | Components of Example 22 + | 115 | 0.34 | 8.7 | 840 | 60 |
|   | SA | 5 |  |  |  |  |
|   | OLO | 10 |  |  |  |  |
| 24 | Components of Example 1 + | 112 | 0.67 | 3.8 | 290 | 63 |
|   | SO1460 | 3 |  |  |  |  |
| 25* | Components of Example 24 + | 115 | 0.36 | 12.5 | 850 | 59 |
|   | SA | 5 |  |  |  |  |
|   | OLO | 10 |  |  |  |  |

TABLE 6-continued

| Examples | Components | phr | $S_{min}$ (dNm) | TS (MPa) | EB (%) | Hardness (Shore A) |
|---|---|---|---|---|---|---|
| 26 | Components of Example 1 + SAc | 112 5 | 0.52 | 6.6 | 500 | 62 |
| 27* | Components of Example 2 + SAc | 115 5 | 0.55 | 8.1 | 560 | 60 |
| 28* | Components of Example 27 + OLO | 120 5 | 0.37 | 5.8 | 640 | 56 |
| 29* | Components of Example 27 + OLO | 120 10 | 0.35 | 11.3 | 870 | 57 |
| 30* | Components of Example 4 + CCO | 120 10 | 0.35 | 6.2 | 560 | 60 |
| 31* | Components of Example 27 + CCO | 120 10 | 0.37 | 6.6 | 650 | 59 |
| 32* | Components of Example 2 + ZS OLO | 115 5 10 | 0.39 | 9.1 | 710 | 57 |
| 33 | EVA CaCO₃ PCD-50 ** PBP-98 | 100 10 2 2 | 0.29 | 5.2 | 360 | 46 |
| 34 | Components of Example 33 + SO1460 | 114 3 | 0.29 | 5.3 | 370 | 49 |
| 35* | Components of Example 34 + SA | 117 5 | 0.18 | 9.6 | 670 | 47 |
| 36* | Components of Example 35 + CCO | 122 10 | 0.09 | 11.2 | 860 | 43 |
| 37* | Components of Example 35 + CSO | 122 10 | 0.08 | 12.2 | 920 | 42 |
| 38* | Components of Example 35 + DOS | 122 10 | 0.10 | 9.7 | 890 | 39 |
| 39* | Components of Example 33 + AM0270 SA CSO | 114 3 5 10 | 0.07 | 8.2 | 830 | 35 |

** denotes the antioxidant Rhenogran PCD-50 available from Rhein Chemie, which is added to prevent a hydrolysis reaction.

The experimental data presented in Table 6 show the results as follows:

It was observed that the melt processability and mechanical properties of the polymer-POSS nanocomposite and its crosslinked product have a tendency to more enhance after an addition of the amphiphilic dispersing agent.

It was observed that the overall properties of the nanocomposite and its crosslinked product have a tendency to more enhance when the solubility parameter (i.e. the Hildebrand solubility parameter (δ)) of the amphiphilic dispersing agent is more similar to that of the polymer.

For example, a comparison of Examples 10 and 30 in Table 6 shows that when the EPDM having a solubility parameter of 7.9 $(cal/cm^3)^{1/2}$ was used, the olive oil (OLO) having a solubility parameter of 7.87 $(cal/cm^3)^{1/2}$ presented a higher efficiency than the coconut oil (CCO) having a solubility parameter of 8.10 $(cal/cm^3)^{1/2}$. On the contrary, a comparison of Examples 36 and 37 in Table 6 shows that when the EVA having a solubility parameter of 9.0 $(cal/cm^3)^{1/2}$ was used, the castor oil (CSO) having a solubility parameter of 8.90 $(cal/cm^3)^{1/2}$ presented a higher efficiency than the coconut oil (CCO) having a solubility parameter of 8.10 $(cal/cm^3)^{1/2}$.

It means that the amphiphilic dispersing agent is better miscible with the polymer matrix when the amphiphilic dispersing agent is more similar in the solubility parameter to the polymer material. Accordingly, it can be understood that the properties of the nanocomposite and its crosslinked product can be more improved when the amphiphilic dispersing agent has a high compatibility with the polymer material. It is also considered that the non-polar tail of the amphiphilic dispersing agent according to the present invention plays a role to ensure a high compatibility with the relatively low polar polymer material.

The melt processability and mechanical properties of the polymer-POSS nanocomposite and its crosslinked product tend to increase with an increase in the quantity of polar groups bonded to the POSS.

For example, when an amphiphilic dispersing agent having a high quantity of polar groups is added, good properties were observed in the nanocomposite comprising a POSS (e.g. EP0409 or SO1460) having a high quantity of polar groups such as hydroxyl groups or glycidyl groups capable of forming a hydrogen bonding or a dipole-dipole interaction (see Examples 10 and 25 in Table 6). On the contrary, the nanocomposite comprising a POSS (e.g., MS0825) having a high quantity of non-polar octaisobutyl groups showed relatively poor properties (see Example 23 in Table 6).

It means that the polar head of the amphiphilic dispersing agent according to the present invention can form a strong physical bond such as a hydrogen bonding or a dipole-dipole interaction with the polar group of the POSS.

It can be understood from the hardness value of Table 6 that the flexibility of the crosslinked product of polymer-POSS nanocomposite comprising the amphiphilic dispersing agent according to the present invention has no significant change or has a slight increase, compared to the flexibility before the addition of the amphiphilic dispersing agent. Therefore, it is demonstrated that the inherent properties of the polymer material itself such as flexibility are improved more or less, or are not significantly affected by the addition of the POSS and the amphiphilic dispersing agent.

The examples according to the invention gathered in Table 6 allows to show an increase in the performances of the rubber nanocomposites.

Furthermore, the crosslinked products, obtained from the polymeric compositions in the examples of Table 6 according to the invention, can have the advantage to be used as self-healing material.

As can be seen from FIG. 2, the particular amphiphilic dispersing agent of the present invention together with the POSS forms a nano-aggregate having a size of several tens of nanometers. As the POSS does not form an aggregate having a size of several micrometers, the nano-aggregate can effectively realize the inherent function of POSS as a nano-filler, thereby significantly enhancing the desired properties in the polymer matrix. In addition, the particular amphiphilic dispersing agent of the present invention provides the hydrophobicity on the surface of the nano-aggregate formed with the POSS. This can remarkably enhance the compatibility and dispersibility of the nano-aggregate within the relatively low polar polymer matrix.

3. Polymeric Composition with Organonanoclay as Nanofiller 3.1. Preparation of Nanocomposite and its Crosslinked Product As a representative example of the process for preparing a polymer-organonanoclay nanocomposite and its crosslinked product, a nanocomposite and its crosslinked product are prepared using the components and the mixing ratio as provided in Example 8 of Table 8, as follows:

Firstly, we mixed EPDM (KEP510, 5-ethylidene-2-norbornene content=5.7 wt %, ethylene content=71 wt %, available from Kumho Polychem Co., Inc.), organonanoclay (Dellite 67G), zinc stearate (ZS) and olive oil (OLO) at the mixing ratio as given in Table 1 using a two-roll mill at 60° C. for 20 minutes.

To the resultant mixture was added a crosslinking agent (PBP-98), and then the mixing was carried out at the room temperature for additional 20 minutes. As a result, an EPDM-organonanoclay nanocomposite was prepared.

Subsequently, the EPDM-organonanoclay nanocomposite thus obtained was compressed under 12.5 MPa at 170° C., and then cross-linked for 15 minutes. As a result, a 1 mm-thick plate-shaped crosslinked product was made.

TABLE 7

| | Components | phr | % by weight |
|---|---|---|---|
| Polymer matrix | EPDM | 100 | 78.7 |
| Nanofiller | organonanoclay (Dellite 67G) | 5 | 3.9 |
| Amphiphilic dispersing agent | zinc stearate (ZS) | 10 | 7.9 |
| Amphiphilic oil | olive oil (OLO) | 10 | 7.9 |
| Crosslinking agent | bis(t-butylperoxyisopropyl)benzene (PBP-98) | 2 | 1.6 |

In Tables 7 and 8, phr is an abbreviation of "parts per hundred parts of rubber", i.e. parts per hundred parts of the polymer matrix.

3.2. Evaluation Method for Melt Processability of Nanocomposite

In order to evaluate the melt processability of a polymer-organonanoclay nanocomposite and measure the crosslinking temperature and time optimized for preparing a crosslinked product of polymer-organonanoclay nanocomposite, a test using a moving die rheometer was carried out to determine the minimum torque value $S_{min}$ and the maximum torque value $S_{max}$ at a given temperature, and the time $t_{c90}$ taken to reach to 90% of the maximum torque value. The $S_{min}$ is in proportion to the viscosity before the crosslinking of the nanocomposite, and can be used as a parameter for relatively comparing the melt processability of the nanocomposite. It is considered that the lower $S_{min}$ represents the better melt processability.

3.3. Evaluation Method for Mechanical Properties of Crosslinked Product

The mechanical properties of the crosslinked product, such as tensile strength (TS) and elongation at break (EB), were determined by preparing dumbbell-shaped species as defined in the DIN 53504.S2 standard and then using a universal tensile strength tester under the condition as defined in the IEC 60811-1-1 standard. When both the values of the tensile strength and the elongation at break are higher, the mechanical properties are considered to be better on the whole.

3.4. Evaluation Method for Thermal Properties of Crosslinked Product

In order to determine the thermal properties of crosslinked product such as the maximum temperature causing pyrolysis ($T_{max}$), a thermogravimetric analysis was carried out by heating to 800° C. at a rate of 20° C./min under air flow using TGA Q50 available from TA Instrument. It is considered that the higher $T_{max}$ represents the better thermal stability.

3.5. Method for Measuring an Interlayer Distance of Organonanoclay within Polymer Matrix In order to determine an interlayer distance of organonanoclay within polymer matrix, X-ray diffraction analysis was carried out at an angle 2θ between 0.7° and 10° using XDS 2000 available from Scintec to measure $d_{(001)}$-spacing. It is considered that the higher $d_{(001)}$-spacing showing an interlayer distance of organonanoclay represents the better dispersibility of the organonanoclay.

3.6. Various Properties Determined Using Different Nanocomposites and Crosslinked Products Thereof Nanocomposites and their crosslinked products were prepared using the components and the mixing ratio as given in Table 8 according to the above-described preparation example. The meaning of the abbreviations described in Table 8 is as defined above in the present specification.

EVA was used as a polymer material having a high polarity, in order to compare with EPDM used as a polymer material having a low polarity. The EVA used herein was Evaflex 45LX (VA content=45 wt %, available from DuPont). In addition, the representative five MMT-derived organonanoclays types aforementioned were used in order to evaluate the efficiency of the amphiphilic dispersing agent and the amphiphilic oil for the organonanoclays with different organic cations intercalated.

The nanocomposites and their crosslinked products thus obtained were determined on the melt processability, mechanical properties, thermal stability, etc. according to the above-described measurement methods. The results are presented in Table 8 below. The Examples in Table 8 marked by "*" denote the polymer-organonanoclay nanocomposite comprising the amphiphilic dispersing agent and the amphiphilic oil according to the present invention. On the contrary, the Examples in Table 8 without a mark "*" denote the comparative example not belonging to the scope of the present invention.

TABLE 8

| Examples | Components | phr | $S_{min}$ (dNm) | TS (MPa) | EB (%) | $T_{max}$(° C.) ($d_{(001)}$-spacing, nm) |
|---|---|---|---|---|---|---|
| 1 | EPDM | 100 | 0.58 | 1.6 | 130 | 481 |
|   | PBP-98 | 2 | | | | |
| 2 | Components of Example 1 + | 102 | 0.47 | 3.3 | 300 | 466 (3.81) |
|   | Delite 67G | 5 | | | | |
| 3 | Components of Example 1 + | 102 | 0.20 | 3.5 | 350 | 479 |
|   | ZS | 10 | | | | |
| 4 | Components of Example 1 + | 102 | 0.23 | 3.5 | 600 | 479 |
|   | OLO | 10 | | | | |
| 5 | Components of Example 2 + | 107 | 0.30 | 4.1 | 440 | 485 (3.72) |
|   | ZS | 10 | | | | |
| 6 | Components of Example 2 + | 107 | 0.23 | 5.2 | 630 | 480 (3.81) |
|   | OLO | 10 | | | | |
| 7* | Components of Example 5 + | 117 | 0.29 | 10.6 | 600 | 483 (3.88) |
|   | OLO | 5 | | | | |
| 8* | Components of Example 5 + | 117 | 0.26 | 14.8 | 770 | 482 (4.42) |
|   | OLO | 10 | | | | |

TABLE 8-continued

| Examples | Components | phr | $S_{min}$ (dNm) | TS (MPa) | EB (%) | $T_{max}$(° C.) ($d_{(001)}$-spacing, nm) |
|---|---|---|---|---|---|---|
| 9* | Components of Example 5 + | 117 | 0.12 | 9.0 | 1030 | 478 |
|  | OLO | 20 |  |  |  |  |
| 10* | Components of Example 2 + | 107 | 0.32 | 12.8 | 770 | 480 |
|  | ZS | 5 |  |  |  |  |
|  | OLO | 10 |  |  |  |  |
| 11 | Components of Example 1 + | 102 | 0.56 | 4.2 | 300 | 477 (3.78) |
|  | Delite 67G | 1 |  |  |  |  |
| 12* | Components of Example 11 + | 103 | 0.22 | 13.1 | 750 | 480 (3.90) |
|  | ZS | 10 |  |  |  |  |
|  | OLO | 10 |  |  |  |  |
| 13 | Components of Example 1 + | 102 | 0.82 | 7.3 | 340 | 459 (3.81) |
|  | Delite 67G | 10 |  |  |  |  |
| 14* | Components of Example 13 + | 112 | 0.31 | 13.4 | 880 | 486 (4.05) |
|  | ZS | 10 |  |  |  |  |
|  | OLO | 10 |  |  |  |  |
| 15* | Components of Example 13 + | 112 | 0.10 | 8.4 | 1110 | 483 |
|  | ZS | 20 |  |  |  |  |
|  | OLO | 20 |  |  |  |  |
| 16* | Components of Example 6 + | 117 | 0.18 | 10.8 | 970 | 483 (4.83) |
|  | SA | 10 |  |  |  |  |
| 17* | Components of Example 6 + | 117 | 0.21 | 11.5 | 800 | 482 (5.35) |
|  | SAm | 10 |  |  |  |  |
| 18* | Components of Example 6 + | 117 | 0.16 | 8.7 | 880 | 483 (3.92) |
|  | SAc | 10 |  |  |  |  |
| 19* | Components of Example 5 + | 117 | 0.17 | 5.4 | 530 | 485 |
|  | CCO | 10 |  |  |  |  |
| 20* | Components of Example 8 + | 127 | 0.21 | 13.6 | 790 | 479 |
|  | $CaCO_3$ | 10 |  |  |  |  |
| 21 | Components of Example 1 + | 102 | 0.49 | 3.3 | 340 | 470 (3.89) |
|  | Cloisite 15 | 5 |  |  |  |  |
| 22* | Components of Example 21 + | 107 | 0.18 | 14.2 | 790 | 480 (3.94) |
|  | ZS | 10 |  |  |  |  |
|  | OLO | 10 |  |  |  |  |
| 23 | Components of Example 1 + | 102 | 0.51 | 2.2 | 250 | 473 (3.60) |
|  | Cloisite 20 | 5 |  |  |  |  |
| 24* | Components of Example 23 + | 107 | 0.20 | 11.1 | 810 | 482 (3.80) |
|  | ZS | 10 |  |  |  |  |
|  | OLO | 10 |  |  |  |  |
| 25 | Components of Example 1 + | 102 | 0.50 | 2.2 | 220 | 475 (3.85) |
|  | Cloisite 30B | 5 |  |  |  |  |
| 26* | Components of Example 25 + | 107 | 0.24 | 9.9 | 820 | 480 (4.25) |
|  | ZS | 10 |  |  |  |  |
|  | OLO | 10 |  |  |  |  |
| 27 | Components of Example 1 + | 102 | 0.48 | 4.8 | 400 | 467 (2.96) |
|  | Cloisite 93A | 5 |  |  |  |  |
| 28* | Components of Example 27 + | 107 | 0.25 | 13.0 | 860 | 483 (3.53) |
|  | ZS | 10 |  |  |  |  |
|  | OLO | 10 |  |  |  |  |
| 29 | EVA | 100 | 0.25 | 2.5 | 290 | 477 |
|  | PCD-50 ** | 2 |  |  |  |  |
|  | PBP-98 | 2 |  |  |  |  |
| 30* | Components of Example 29 + | 104 | 0.12 | 9.4 | 710 | 481 |
|  | Delite 67G | 5 |  |  |  |  |
|  | ZS | 10 |  |  |  |  |
|  | CCO | 10 |  |  |  |  |
| 31* | Components of Example 29 + | 104 | 0.11 | 13.0 | 750 | 482 (4.49) |
|  | Delite 67G | 5 |  |  |  |  |
|  | ZS | 10 |  |  |  |  |
|  | DOS | 10 |  |  |  |  |
| 32* | Components of Example 29 + | 104 | 0.10 | 12.5 | 850 | 481 |
|  | Cloisite 15 | 5 |  |  |  |  |
|  | ZS | 10 |  |  |  |  |
|  | CSO | 10 |  |  |  |  |
| 33* | Components of Example 29 + | 104 | 0.11 | 12.2 | 880 | 482 |
|  | Cloisite 20 | 5 |  |  |  |  |
|  | ZS | 10 |  |  |  |  |
|  | CSO | 10 |  |  |  |  |
| 34* | Components of Example 29 + | 104 | 0.10 | 14.3 | 860 | 482 |
|  | Cloisite 30B | 5 |  |  |  |  |
|  | ZS | 10 |  |  |  |  |
|  | CSO | 10 |  |  |  |  |

** denotes the antioxidant Rhenogran PCD-50 available from Rhein Chemie, which is added to prevent a hydrolysis reaction.

The experimental data presented in Table 8 show the results as follows:

The polymer-organonanoclay nanocomposite and its crosslinked product belonging to the scope of the present invention (Examples marked by "*" in Table 8) show significantly improved effects in overall view of melt processability, tensile strength, elongation at break, thermal stability and interlayer distance of organonanoclay, when compared to those not belonging to the scope of the present invention (Examples not marked by "*" in Table 8).

Among the polymer-organonanoclay nanocomposites belonging to the scope of the present invention, it is understood from the further observations below that it can be further optimized for different industrial uses.

It was observed that the performances of nanocomposite have a tendency to more enhance when the interlayer distance of organonanoclay dispersed in polymer matrix is longer.

It means that the amphiphilic dispersing agents and the amphiphilic oils comprised in the nanocomposite of the present invention play a role to effectively increase an exfoliation and a dispersibility of organonanoclay within polymer matrix.

It was observed that the overall properties of the nanocomposite and its crosslinked product have a tendency to more enhance when the solubility parameter (i.e. the Hildebrand solubility parameter ($\delta$)) of the amphiphilic oil is more similar to that of the polymer.

For example, a comparison of Examples 8 and 19 in Table 8 shows that when the EPDM having a solubility parameter of 7.9 $(cal/cm^3)^{1/2}$ was used, the olive oil (OLO) having a solubility parameter of 7.87 $(cal/cm^3)^{1/2}$ presented a higher efficiency than the coconut oil (CCO) having a solubility parameter of 8.10 $(cal/cm^3)^{1/2}$. On the contrary, a comparison of Examples 30 and 31 in Table 8 shows that when the EVA having a solubility parameter of 9.0 $(cal/cm^3)^{1/2}$ was used, the dioctyl sebacate (DOS) having a solubility parameter of 8.6 $(cal/cm^3)^{1/2}$ presented a higher efficiency than the coconut oil (CCO) having a solubility parameter of 8.10 $(cal/cm^3)^{1/2}$.

It means that the amphiphilic oil is better miscible with the polymer matrix when the amphiphilic oil is more similar in the solubility parameter to the polymer material. Accordingly, it can be understood that the properties of the nanocomposite and its crosslinked product can be more improved when the amphiphilic oil has a high compatibility with the polymer material.

It was observed that the nanocomposite and its crosslinked product have a tendency to more enhance the overall properties when the amphiphilic dispersing agent or the amphiphilic oil has anions capable of forming a strong secondary bonding with organic cations of organonanoclay (see Example 8 in Table 8) or electron-donating functional groups (see Examples 16 and 17 in Table 8).

It was observed that the nanocomposite and its crosslinked product have a tendency to more enhance the overall properties when the polarity of organic cation intercalated between layers of organonanoclay is more similar to the polarity of polymer matrix.

For example, when the polymer matrix is EPDM with relatively low polarity, the properties of the nanocomposite and its crosslinked product is more improved in the organonanoclay wherein the intercalated organic cation has low-polar functional groups (see Examples 8 and 22 in Table 8). On the contrary, when the polymer matrix is EVA with relatively high polarity, the properties of the nanocomposite and its crosslinked product is more improved in the organonanoclay wherein the intercalated organic cation has high-polar functional groups (see Example 34 in Table 8).

The examples according to the invention gathered in Table 8 allows to show an increase in the performances of the rubber nanocomposites.

Furthermore, the crosslinked products, obtained from the polymeric compositions in the examples of Table 8 according to the invention, can have the advantage to be used as self-healing material.

The invention claimed is:

1. Cable comprising an elongated conducting element and a self-healing material surrounding said elongated conducting element, wherein the self-healing material is a cross-linked material obtained from a polymeric composition comprising:
   A. a polymer matrix comprising at least one olefin polymer with hydrophilic moiety, and
   B. at least one amphiphilic compound, as self-healing additive,
   wherein the polymeric composition comprises at least 10 % by weight of amphiphilic compound(s) B over the total weight of the polymeric composition.

2. Cable according to claim 1, wherein the olefin polymer with hydrophilic moiety is an ethylene vinyl acetate copolymer.

3. Cable according to claim 1, wherein the polymer matrix A is only composed of one or several olefin polymer(s) with hydrophilic moiety.

4. Cable according to claim 1, wherein the amphiphilic compound is able to form intermolecular interactions with the olefin polymer with hydrophilic moiety, during the healing process.

5. Cable according to claim 1, wherein the amphiphilic compound and the olefin polymer with hydrophilic moiety are compatible together.

6. Cable according to claim 1, wherein the amphiphilic compound comprises:
   an aliphatic chain, saturated or unsaturated, comprising at least four carbon atoms, as lipophilic moiety, and
   a hydrophilic moiety.

7. Cable according to claim 6, wherein the hydrophilic moiety is selected among carboxylic acid, precursors of carboxylic acids, ionic form of carboxylic acids, esters, amines, amides, alcohols, any derivative thereof, and any combination thereof.

8. Cable according to claim 1, wherein the amphiphilic compound is a polymeric compound selected among grafted olefin polymers, polymers with hydrophilic moities, and any derivative thereof.

9. Cable according to claim 1, wherein the amphiphilic compound is a non-polymeric compound selected among fatty acids and any derivative thereof.

10. Cable according to claim 9, wherein the fatty acid is selected among oleic acid, ricinoleic acid and any derivative thereof.

11. Cable according to claim 9, wherein the fatty acid is triglycerides of oleic acid or triglycerides of ricinoleic acid.

12. Cable according to claim 9, wherein the fatty acid is selected among oil polyols.

13. Cable according to claim 1, wherein the polymeric composition comprises at least two amphiphilic compounds B.

14. Cable according to claim 1, wherein the polymeric composition comprises at least 30 % by weight of ethylene vinyl acetate copolymer over the total weight of the polymeric composition.

15. Cable according to claim 1, wherein the polymeric composition comprises less than 40 % by weight of flame retardant filler over the total weight of the polymeric composition.

16. Cable according to claim 1, wherein the polymeric composition of the invention comprises:
   A. the polymer matrix comprising at least one ethylene vinyl acetate copolymer with a vinyl acetate moiety content of at least 40 % by weight, and
   B. at least 30 parts by weight of the amphiphilic compound(s) with respect to 100 parts by weight of polymer matrix A.

17. Cable according to claim 1, wherein the polymeric composition further comprises an organic peroxide as cross-linking agent.

18. Cable according to claim 1, wherein the cross-linked material is an extruded material.

19. Cable according to claim 1, wherein said cross-linked material is a material selected among an insulating layer, a protecting jacket, and a bedding.

20. Process of manufacturing the cable according to claim 1, wherein the process comprises the following steps:
   i. mixing the polymeric composition;
   ii. applying the mixed polymeric composition around the elongated conducting element; and
   iii. cross-linking the polymeric composition of step ii, to obtain the cross- linked material surrounding the elongated conducting element.

21. The cable as claimed in claim 1, wherein the amphipilic compound is different from the olefin polymer with hydrophilic moiety.

22. A crosslinked product obtained from nanocomposite of polymer and POSS (Polyhedral Oligomeric Silsesquioxane), comprising:
   at least one amphiphilic dispersing agent selected from the group consisting of an amphiphilic carboxylic acid-based dispersing agent, an amphiphilic amine-based dispersing agent, a vegetable oil having a triglyceride structure, a process oil having an ester group, and a mixture thereof.

23. A crosslinked product obtained from nanocomposite of polymer and organonanoclay, comprising :
- (b1) an amphiphilic dispersing agent selected from the group consisting of an amphiphilic carboxylic acid-based dispersing agent, an amphiphilic amine-based dispersing agent, and a mixture thereof; and
- (b2) an amphiphilic oil selected from the group consisting of a vegetable oil having a triglyceride structure, a process oil having an ester group, and a mixture thereof.

\* \* \* \* \*